(12) United States Patent
Andersson et al.

(10) Patent No.: US 10,941,745 B2
(45) Date of Patent: Mar. 9, 2021

(54) IGNITION SYSTEM FOR LIGHT-DUTY COMBUSTION ENGINE

(71) Applicant: WALBRO LLC, Tucson, AZ (US)

(72) Inventors: Martin N. Andersson, Caro, MI (US); Cyrus M. Healy, Ubly, MI (US)

(73) Assignee: Walbro LLC, Tucson, AZ (US)

( * ) Notice: Subject to any disclaimer, the term of this patent is extended or adjusted under 35 U.S.C. 154(b) by 158 days.

(21) Appl. No.: 15/743,104

(22) PCT Filed: Jul. 21, 2016

(86) PCT No.: PCT/US2016/043237
§ 371 (c)(1),
(2) Date: Jan. 9, 2018

(87) PCT Pub. No.: WO2017/015420
PCT Pub. Date: Jan. 26, 2017

(65) Prior Publication Data
US 2019/0078547 A1     Mar. 14, 2019

Related U.S. Application Data

(60) Provisional application No. 62/195,046, filed on Jul. 21, 2015.

(51) Int. Cl.
*F02P 3/04* (2006.01)
*F02P 1/02* (2006.01)
(Continued)

(52) U.S. Cl.
CPC ............... *F02P 3/0407* (2013.01); *F02P 1/02* (2013.01); *F02P 1/083* (2013.01); *F02P 3/0442* (2013.01);
(Continued)

(58) Field of Classification Search
CPC .......... F02P 3/0407; F02P 3/08; F02P 3/0442; F02P 1/083; F02P 1/02; F02P 5/1502;
(Continued)

(56) References Cited

U.S. PATENT DOCUMENTS 4,213,436 A * 7/1980 Burson ..................... F02P 1/00
                                                    123/599
4,911,126 A * 3/1990 Notaras ................... F02P 1/083
                                                    123/335

(Continued)

FOREIGN PATENT DOCUMENTS

EP         2060778 A2    5/2009
GB         545815 A      6/1942
(Continued)

OTHER PUBLICATIONS

International Search Report and Written Opinion in PCT/US2016/043237 dated Oct. 26, 2016 (11 pages).

(Continued)

*Primary Examiner* — Joseph J Dallo
*Assistant Examiner* — Scott A Reinbold
(74) *Attorney, Agent, or Firm* — Reising Ethington P.C.

(57) ABSTRACT

In at least some implementations, an auxiliary power supply in an ignition system for a light-duty combustion engine includes a first auxiliary winding and a second auxiliary winding coupled in parallel with the first auxiliary winding such that both windings are arranged to provide power to an auxiliary load. The first auxiliary winding may include a greater number of turns than the second auxiliary winding. A ratio of the number of turns in the first auxiliary winding to the number of turns in the second auxiliary winding may be between 1.5:1 and 10:1, the first auxiliary coil and the second auxiliary coil may have between 50 and 2,000 turns, (Continued)

and the first auxiliary coil and the second auxiliary coil are formed from wire between 25 and 45 gauge.

20 Claims, 1 Drawing Sheet

(51) Int. Cl.
- *F02P 1/08* (2006.01)
- *F02P 5/15* (2006.01)
- *F02P 3/08* (2006.01)
- *F02N 3/02* (2006.01)

(52) U.S. Cl.
CPC ............... *F02P 3/08* (2013.01); *F02P 5/1502* (2013.01); *F02D 2400/06* (2013.01); *F02N 3/02* (2013.01); *Y02T 10/40* (2013.01)

(58) Field of Classification Search
CPC ... F02P 1/08; F02P 1/086; Y02T 10/46; F02D 2400/06; F02N 3/02
USPC .......................................................... 123/149
See application file for complete search history.

(56) References Cited

U.S. PATENT DOCUMENTS

| | | | |
|---|---|---|---|
| 6,899,092 B2 | 5/2005 | Arens | |
| 6,932,064 B1* | 8/2005 | Kolak | ..................... F02P 1/083 123/594 |
| 7,546,836 B2 | 6/2009 | Andersson et al. | |
| 2010/0258099 A1* | 10/2010 | Andersson | .......... F02D 41/1446 123/676 |

FOREIGN PATENT DOCUMENTS

| | | | | |
|---|---|---|---|---|
| JP | 61-031662 A | | 2/1986 | |
| JP | 61031662 A | * | 2/1986 | .............. F02P 1/086 |
| JP | S63183268 A | | 7/1988 | |
| WO | WO-2014179697 A1 | * | 11/2014 | ................ F02P 3/04 |
| WO | WO2014179697 A1 | | 11/2014 | |

OTHER PUBLICATIONS

Chinese Search Report dated Jul. 30, 2019 in Chinese Patent Application No. 201680054652.0 (3 pages).

* cited by examiner

IGNITION SYSTEM FOR LIGHT-DUTY COMBUSTION ENGINE

REFERENCE TO CO-PENDING APPLICATIONS

This application claims the benefit of U.S. Provisional Patent Application Ser. No. 62/195,046 filed Jul. 21, 2015, which is incorporated herein by reference in its entirety.

TECHNICAL FIELD

The present disclosure relates generally to ignition systems for light-duty combustion engines.

BACKGROUND

Various ignition systems for light-duty combustion engines are known in the art and are used with a wide range of devices, such as lawn equipment and chainsaws. Typically, these ignition systems do not have a battery, instead they rely upon a pull-rope recoil starter and a magneto-type system to provide electrical energy for ignition and to operate other electrical devices. Because such systems can only produce a finite amount of electrical energy and still achieve certain energy efficiency and emissions goals, there is a need to generate and manage electrical energy in the system in as efficient a manner as possible.

SUMMARY

In at least some implementations, an auxiliary power supply in an ignition system for a light-duty combustion engine includes a first auxiliary winding and a second auxiliary winding coupled in parallel with the first auxiliary winding such that both windings are arranged to provide power to an auxiliary load. The first auxiliary winding may include a greater number of turns than the second auxiliary winding. A ratio of the number of turns in the first auxiliary winding to the number of turns in the second auxiliary winding may be between 1.5:1 and 10:1, the first auxiliary coil and the second auxiliary coil may have between 50 and 2,000 turns, and the first auxiliary coil and the second auxiliary coil are formed from wire between 25 and 45 gauge.

In at least some implementations, an ignition system for a light-duty combustion engine includes a charge winding, first and second auxiliary windings adapted to provide power for an auxiliary load, a microcontroller and a power supply sub-circuit coupled to both the charge winding and the microcontroller. The power supply sub-circuit includes a first power supply switch, a power supply capacitor and a power supply zener. The power supply sub-circuit is arranged to turn off the first power supply switch so that it stops charging the power supply capacitor when the charge on the power supply capacitor exceeds the breakdown voltage on the power supply zener.

In at least some implementations, the second auxiliary winding is coupled in parallel with the first auxiliary winding such that both windings are arranged to provide power to an auxiliary load. The first auxiliary winding may include a greater number of turns than the second auxiliary winding, a ratio of the number of turns in the first auxiliary winding to the number of turns in the second auxiliary winding may be between 1.5:1 and 10:1, and/or the first auxiliary coil and the second auxiliary coil have between 50 and 2,000 turns. Further, the first auxiliary coil and the second auxiliary coil may be formed from wire between 25 and 45 gauge.

A light-duty combustion engine system includes a flywheel that is rotated in use and includes at least one magnet, a charge winding, first and second auxiliary windings, a microcontroller and a power supply sub-circuit. The charge winding is located adjacent to the flywheel so that the magnet induces a voltage in the charge winding as the flywheel is rotated. The first auxiliary winding is adapted to provide power for an auxiliary load and has a first number of turns. The second auxiliary winding is adapted to provide power for the auxiliary load and has a second number of turns that is less than the first number of turns. The power supply sub-circuit is coupled to both the charge winding and the microcontroller. The power supply sub-circuit includes a first power supply switch, a power supply capacitor and a power supply zener, and is arranged to turn off the first power supply switch so that it stops charging the power supply capacitor when the charge on the power supply capacitor exceeds the breakdown voltage on the power supply zener

BRIEF DESCRIPTION OF THE DRAWINGS

The following detailed description of certain embodiments and best mode will be set forth with reference to the accompanying drawings, in which.

DETAILED DESCRIPTION

The methods and systems described herein generally relate to light-duty combustion engines that are gasoline powered and include ignition systems with microcontroller circuitry. Many light-duty combustion engines do not have a battery to supply electrical energy, instead, these engines use a magneto-type ignition system to generate, store and provide electrical energy to various devices. Because a magneto-type ignition system can only generate a finite amount of electrical energy at a certain engine speed, while still satisfying fuel efficiency and emission targets, it can be important for such a system to operate as efficiently as possible in terms of energy management.

As disclosed herein, the ignition system is designed to improve the energy provided to power an auxiliary load over a range of engine speeds. As used herein, an auxiliary load relates to a component not directly associated with providing an ignition spark to ignite a fuel and air mixture within an engine combustion chamber. A representative auxiliary load includes an electrically powered valve, such as a solenoid valve in a carburetor that may be used to alter the air and fuel mixture provided from the carburetor to the engine. Such solenoids are known in the art to selectively inhibit or block a portion of an air or fuel flow within a carburetor to change the air/fuel ratio of the fuel mixture delivered from the carburetor. U.S. Pat. No. 9,062,629 discloses a solenoid of this type, and is incorporated herein by reference in its entirety.

Typically, the light-duty combustion engine is a single cylinder two-stroke or four-stroke gasoline powered internal combustion engine. A single piston is slidably received for reciprocation in the cylinder and is connected by a tie rod to a crank shaft that, in turn, is attached to a fly wheel. Such engines are oftentimes paired with a capacitive discharge ignition (CDI) system that utilizes a microcontroller to supply a high voltage ignition pulse to a spark plug for igniting an air-fuel mixture in the engine combustion chamber. The term "light-duty combustion engine" broadly includes all types of non-automotive combustion engines, including two and four-stroke engines typically used to power devices such as gasoline-powered hand-held power tools, lawn and garden equipment, lawnmowers, weed trimmers, edgers, chain saws, snowblowers, personal watercraft, boats, snowmobiles, motorcycles, all-terrain-vehicles, etc. It should be appreciated that while the following description is in the context of a capacitive discharge ignition (CDI) system, the control circuit and/or the power supply sub-circuit described herein may be used with any number of different ignition systems and are not limited to the particular one shown here.

Figure 1:
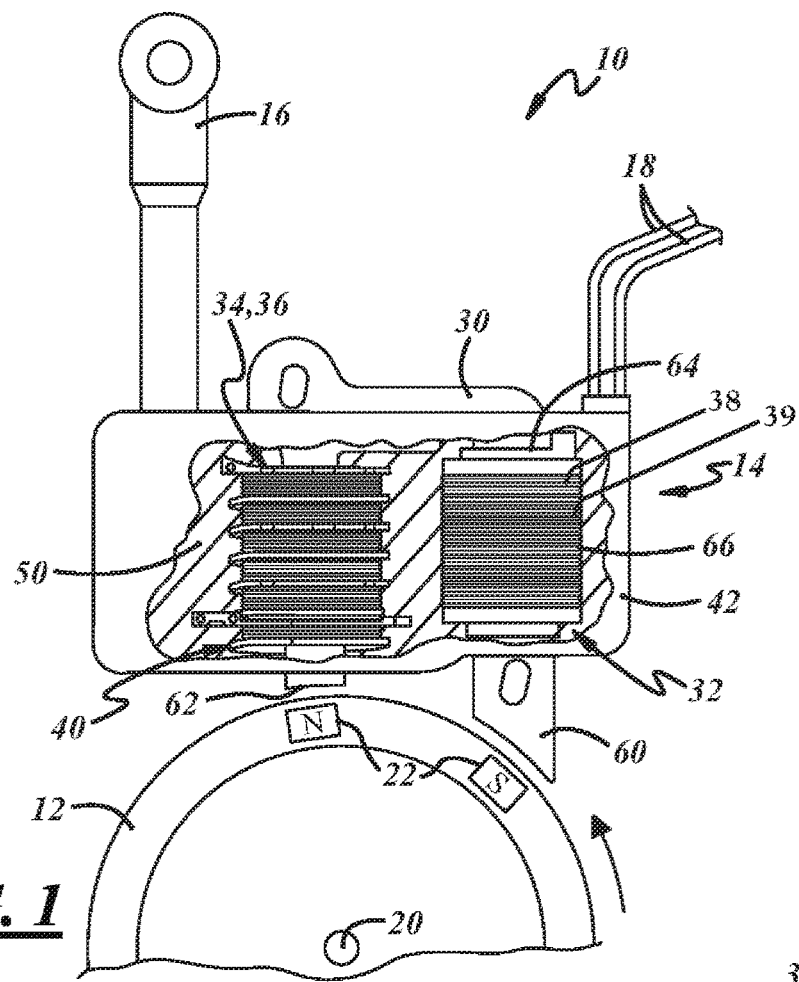
FIG. 1 shows an example of a capacitor discharge ignition (CDI) system for a light-duty combustion engine.

With reference to FIG. 1, there is shown a cut-away view of an exemplary capacitive discharge ignition (CDI) system 10 that interacts with a flywheel 12 and generally includes an ignition module 14, an ignition lead 16 for electrically coupling the ignition module to a spark plug SP (shown in FIG. 2), and electrical connections 18 for coupling the ignition module to one or more auxiliary loads, such as a carburetor solenoid valve. The flywheel 12 shown here includes a pair of magnetic poles or elements 22 located towards an outer periphery of the flywheel, although other arrangements may be used as desired. For example, the flywheel may have a single magnet (between a pair of pole shoes) or a flywheel with two sets of magnets nominally 180 degrees apart (e.g. 170-190 degrees apart, or diametrically opposed, and each between a pair of pole shoes) and arranged with opposite leading poles relative to the direction of rotation. Once flywheel 12 is rotating, magnetic elements 22 spin past and electromagnetically interact with the different coils or windings in ignition module 14.

Ignition module 14 can generate, store, and utilize the electrical energy that is induced by the rotating magnetic elements 22 in order to perform a variety of functions. According to one embodiment, ignition module 14 includes a lamstack 30, a charge winding 32, a primary winding 34 and a secondary winding 36 that together constitute a step-up transformer, a first auxiliary winding 38, a second auxiliary winding 39, a trigger winding 40, an ignition module housing 42, and a control circuit 50. Lamstack 30 is preferably a ferromagnetic part that is comprised of a stack of flat, magnetically-permeable, laminate pieces typically made of steel or iron. The lamstack can assist in concentrating or focusing the changing magnetic flux created by the rotating magnetic elements 22 on the flywheel. According to the embodiment shown here, lamstack 30 has a generally U-shaped configuration that includes a pair of legs 60 and 62. Leg 60 is aligned along the central axis of charge winding 32, and leg 62 is aligned along the central axes of trigger winding 40 and the step-up transformer. The first auxiliary winding 38, second auxiliary winding 39 and charge winding 32 are shown on leg 60, however, these windings or coils could be located elsewhere on the lamstack 30. When legs 60 and 62 align with magnetic elements 22—this occurs at a specific rotational position of flywheel 12—a closed-loop flux path is created that includes lamstack 30 and magnetic elements 22. Magnetic elements 22 can be implemented as part of the same magnet or as separate magnetic components coupled together to provide a single flux path through flywheel 12, to cite two possibilities. Additional magnetic elements can be added to flywheel 12 at other locations around its periphery to provide additional electromagnetic interaction with ignition module 14.

Charge winding 32 generates electrical energy that can be used by ignition module 14 for a number of different purposes, including charging an ignition capacitor and powering an electronic processing device, to cite two examples. Charge winding 32 includes a bobbin 64 and a winding 66 and, according to one embodiment, is designed to have a relatively low inductance and a relatively low resistance, but this is not necessary.

Trigger winding 40 provides ignition module 14 with an engine input signal that is generally representative of the position and/or speed of the engine. According to the particular embodiment shown here, trigger winding 40 is located towards the end of lamstack leg 62 and is adjacent to the step-up transformer. It could, however, be arranged at a different location on the lamstack. For example, it is possible to arrange both the trigger and charge windings on a single leg of the lamstack, as opposed to arrangement shown here. It is also possible for trigger winding 40 to be omitted and for ignition module 14 to receive an engine input signal from charge winding 32 or some other device.

Step-up transformer uses a pair of closely-coupled windings 34, 36 to create high voltage ignition pulses that are sent to a spark plug SP via ignition lead 16. Like the charge and trigger windings described above, the primary and secondary windings 34, 36 surround one of the legs of lamstack 30, in this case leg 62. The primary winding 34 has fewer turns of wire than the secondary winding 36, which has more turns of finer gauge wire. The turn ratio between the primary and secondary windings, as well as other characteristics of the transformer, affect the voltage and are typically selected based on the particular application in which it is used.

Ignition module housing 42 is preferably made from a plastic, metal, or some other material, and is designed to surround and protect the components of ignition module 14. The ignition module housing has several openings to allow lamstack legs 60 and 62, ignition lead 16, and electrical connections 18 to protrude, and preferably are sealed so that moisture and other contaminants are prevented from damaging the ignition module. It should be appreciated that ignition system 10 is just one example of a capacitive discharge ignition (CDI) system that can utilize ignition module 14, and that numerous other ignition systems and components, in addition to those shown here, could also be used as well.

Control circuit 50 may be carried within the housing 42 and is coupled to portions of the ignition module 14 and the ignition lead 16 so that it can control the energy that is induced, stored and discharged by the ignition system 10. The term "coupled" broadly encompasses all ways in which two or more electrical components, devices, circuits, etc. can be in electrical communication with one another; this includes but is certainly not limited to, a direct electrical connection and a connection via intermediate components, devices, circuits, etc. The control circuit 50 may be provided according to the exemplary embodiment shown in FIG. 2 where the control circuit is coupled to and interacts with charge winding 32, primary ignition winding 34, first auxiliary winding 38, second auxiliary winding 39, and trigger winding 40. According to this particular example, the control circuit 50 includes an ignition discharge capacitor 52, an ignition discharge switch 54, a microcontroller 56, a power supply sub-circuit 58, as well as any number of other electrical elements, components, devices and/or sub-circuits that may be used with the control circuit and are known in the art (e.g., kill switches and kill switch circuitry).

The ignition discharge capacitor 52 acts as a main energy storage device for the ignition system 10. According to the embodiment shown in FIG. 2, the ignition discharge capacitor 52 is coupled to the charge winding 32 and the ignition discharge switch 54 at a first terminal, and is coupled to the primary winding 34 at a second terminal. The ignition discharge capacitor 52 is configured to receive and store electrical energy from the charge winding 32 via diode 70 and to discharge the stored electrical energy through a path that includes the ignition discharge switch 54 and the primary winding 34. Discharge of the electrical energy stored on the ignition discharge capacitor 52 is controlled by the state of the ignition discharge switch 54, as is widely understood in the art.

The ignition discharge switch 54 acts as a main switching device for the ignition system 10. The ignition discharge switch 54 is coupled to the ignition discharge capacitor 52 at a first current carrying terminal, to ground at a second current carrying terminal, and to an output of the microcontroller 56 at its gate. The ignition discharge switch 54 can be provided as a thyristor, for example, a silicon controlled rectifier (SCR). An ignition trigger signal from an output of the microcontroller 56 activates the ignition discharge switch 54 so that the ignition discharge capacitor 52 can discharge its stored energy through the switch and thereby create a corresponding ignition pulse in the ignition coil.

The microcontroller 56 is an electronic processing device that executes electronic instructions in order to carry out functions pertaining to the operation of the light-duty combustion engine. This may include, for example, electronic instructions used to implement the methods described herein. In one example, the microcontroller 56 includes the 8-pin processor illustrated in FIG. 2, however, any other suitable controller, microcontroller, microprocessor and/or other electronic processing device may be used instead. Pins 1 and 8 are coupled to the power supply sub-circuit 58, which provides the microcontroller with power that is somewhat regulated; pins 2 and 7 are coupled to trigger winding 40 and provide the microcontroller with an engine signal that is representative of the speed and/or position of the engine (e.g., position relative to top-dead-center); pins 3 and 5 are shown as being unconnected, but may be coupled to other components like a kill-switch used to stop engine operation; pin 4 is coupled to ground; and pin 6 is coupled to the gate of ignition discharge switch 54 so that the microcontroller can provide an ignition trigger signal, sometimes called a timing signal, for activating the switch. Some non-limiting examples of how microcontrollers can be implemented with ignition systems are provided in U.S. Pat. Nos. 7,546,836 and 7,448,358, the entire contents of which are hereby incorporated by reference.

The power supply sub-circuit 58 receives electrical energy from the charge winding 32, stores the electrical energy, and provides the microcontroller 56 with regulated, or at least somewhat regulated, electrical power. The power supply sub-circuit 58 is coupled to the charge winding 32 at an input terminal 80 and to the microcontroller 56 at an output terminal 82 and, according to the example shown in FIG. 2, includes a first power supply switch 90, a power supply capacitor 92, a power supply zener 94, a second power supply switch 96, and one or more power supply resistors 98. As will be explained below in more detail, the power supply sub-circuit 58 is designed and configured to reduce the portion of the charge winding load that is attributable to powering the microcontroller 56.

The first power supply switch 90, which can be any suitable type of switching device like a BJT or MOSFET, is coupled to the charge winding 32 at a first current carrying terminal, to the power supply capacitor 92 at a second current carrying terminal, and to the second power supply switch 96 at a base or gate terminal. When the first power supply switch 90 is activated or is in an 'on' state, current is allowed to flow from the charge winding 32 to the power supply capacitor 92; when the switch 90 is deactivated or is in an 'off' state, current is prevented from flowing from the charge winding 32 to the capacitor 92. As mentioned above, any suitable type of switching device may be used for the first power supply switch 90, but such a device should be able to handle a significant amount of voltage; for example between about 150 V and 450 V.

The power supply capacitor 92 is coupled to the first power supply switch 90, the power supply zener 94 and the microcontroller 56 at a positive terminal, and is coupled to ground at a negative terminal. The power supply capacitor 92 receives and stores electrical energy from the charge winding 32 so that it may power the microcontroller 56 in a somewhat regulated and consistent manner. Skilled artisans will appreciate that the operating parameters of the power supply capacitor 92 are generally dictated by the needs of the specific control circuit in which it is being used, however, in one example, the power supply capacitor has a capacitance between about 50 µF and 470 µF.

The power supply zener 94 is coupled to the power supply capacitor 92 at a cathode terminal and is coupled to second power supply switch 96 at an anode terminal. The power supply zener 94 is arranged to be non-conductive so as long as the voltage on the power supply capacitor 92 is less than the breakdown voltage of the zener diode and to be conductive when the capacitor voltage exceeds the breakdown voltage. Skilled artisans will appreciate that a zener diode with a particular breakdown voltage may be selected based on the amount of electrical energy that is deemed necessary for the power supply sub-circuit 58 to properly power the microcontroller 56. Any zener diode or other similar device may be used, including zener diodes having a breakdown voltage between about 3 V and 20 V.

The second power supply switch 96 is coupled to resistor 98 and the base of the first power supply switch 90 at a first current carrying terminal, to ground at a second current carrying terminal, and to the power supply zener diode 94 at a gate. As will be described below in more detail, the second power supply switch 96 is arranged so that when the voltage at the zener diode 94 is less than its breakdown voltage, the second power supply switch 96 is held in a deactivated or 'off' state; when the voltage at the zener diode exceeds the breakdown voltage, then the voltage at the gate of the second power supply switch 96 increases and activates that device so that it turns 'on'. Again, any number of different types of switching devices may be used, including thyristors in the form of silicon controlled rectifiers (SCRs). According to one non-limiting example, the second power supply switch is an SCR and has a gate current rate between about 2 µA and 3 mA.

The power supply resistor 98 is coupled at one terminal to charge winding 32 and one of the current carrying terminals of the first power supply switch 90, and at another terminal to one of the current carrying terminals of the second power supply switch 96. It is preferable that power supply resistor 98 have a sufficiently high resistance so that a high-resistance, low-current path is established through the resistor when the second power supply switch 96 is turned 'on'. In one example, the power supply resistor 98 has a resistance between about 5 kΩ and 10 kΩ, however, other values may certainly be used instead.

During a charging cycle, electrical energy induced in the charge winding 32 may be used to charge, drive and/or otherwise power one or more devices around the engine. For example, as the flywheel 12 rotates past the ignition module 14, the magnetic elements 22 located towards the outer perimeter of the flywheel induce an AC voltage in the charge winding 32. A positive component of the AC voltage may be used to charge the ignition discharge capacitor 52, while a negative component of the AC voltage may be provided to the power supply sub-circuit 58 which then powers the microcontroller 56 with regulated DC power. The power supply sub-circuit 58 is designed to limit or reduce the amount of electrical energy taken from the negative component of the AC voltage to a level that is still able to sufficiently power the microcontroller 56, yet saves energy for use elsewhere in the system. One example of a device that may benefit from this energy savings is a solenoid that is coupled to the windings 38 and 39 and is used to control the air/fuel ratio being provided to the combustion chamber.

Beginning with the positive component or portion of the AC voltage that is induced in the charge winding 32, current flows through diode 70 and charges ignition discharge capacitor 52. So long as the microcontroller 56 holds the ignition discharge switch 54 in an 'off' state, the current from the charge winding 32 is directed to the ignition discharge capacitor 52. It is possible for the ignition discharge capacitor 52 to be charged throughout the entire positive portion of the AC voltage waveform, or at least for most of it. When it is time for the ignition system 10 to fire the spark plug SP (i.e., the ignition timing), the microcontroller 56 sends an ignition trigger signal to the ignition discharge switch 54 that turns the switch 'on' and creates a current path that includes the ignition discharge capacitor 52 and the primary ignition winding 34. The electrical energy stored on the ignition discharge capacitor 52 rapidly discharges via the current path, which causes a surge in current through the primary ignition winding 34 and creates a fast-rising electro-magnetic field in the ignition coil. The fast-rising electro-magnetic field induces a high voltage ignition pulse in the secondary ignition winding 36 that travels to the spark plug SP and provides a combustion-initiating spark. Other sparking techniques, including flyback techniques, may be used instead.

Turning now to the negative component or portion of the AC voltage that is induced in the charge winding 32, current initially flows through the first power supply switch 90 and charges power supply capacitor 92. So long as second power supply switch 96 is turned 'off', there is current flow through power supply resistor 98 so that the voltage at the base of the first power supply switch 90 biases the switch in an 'on' state. Charging of the power supply capacitor 92 continues until a certain charge threshold is met; that is, until the accumulated charge on capacitor 92 exceeds the breakdown voltage of the power supply zener 94. As mentioned above, zener diode 94 is preferably selected to have a certain breakdown voltage that corresponds to a desired charge level for the power supply sub-circuit 58. Some initial testing has indicated that a breakdown voltage of approximately 6 V may be suitable. The power supply capacitor 92 uses the accumulated charge to provide the microcontroller 56 with regulated DC power. Of course, additional circuitry like the secondary stage circuitry 86 may be employed for reducing ripples and/or further filtering, smoothing and/or otherwise regulating the DC power.

Once the stored charge on the power supply capacitor 92 exceeds the breakdown voltage of the power supply zener 94, the zener diode becomes conductive in the reverse bias direction so that the voltage seen at the gate of the second power supply switch 96 increases. This turns the second power supply switch 96 'on', which creates a low current path 84 that flows through resistor 98 and switch 96 and lowers the voltage at the base of the first power supply switch 90 to a point where it turns that switch 'off'. With first power supply switch 90 deactivated or in an 'off' state, additional charging of the power supply capacitor 92 is prevented. Moreover, power supply resistor 98 preferably exhibits a relatively high resistance so that the amount of current that flows through the low current path 84 during this period of the negative portion of the AC cycle is minimal (e.g., on the order of 50 μA) and, thus, limits the amount of wasted electrical energy. The first power supply switch 90 will remain 'off' until the microcontroller 56 pulls enough electrical energy from power supply capacitor 92 to drop its voltage below the breakdown voltage of the power supply zener 94, at which time the second power supply switch 96 turns 'off' so that the cycle can repeat itself. This arrangement may somewhat simulate a low cost hysteresis approach.

Accordingly, instead of charging the power supply capacitor 92 during the entire negative portion of the AC voltage waveform, the power supply sub-circuit 58 only charges capacitor 92 for a first segment of the negative portion of the AC voltage waveform; during a second segment, the capacitor 92 is not being charged. Put differently, the power supply sub-circuit 58 only charges the power supply capacitor 92 until a certain charge threshold is reached, after which additional charging of capacitor 92 is cut off. Because less electrical current is flowing from the charge winding 32 to the power supply sub-circuit 58, the electromagnetic load on the winding and/or the circuit is reduced, thereby making more electrical energy available for other windings and/or other devices. If the electrical energy in the ignition system 10 is managed efficiently, it may possible for the system to support both an ignition load and external loads (e.g., an air/fuel ratio regulating solenoid) on the same magnetic circuit.

This arrangement and approach is different than simply utilizing a simple current limiting circuit to clip the amount of current that is allowed into the power supply sub-circuit 58 at any given time. Such an approach may result in undesirable effects, in that it may be slow to reach a working voltage due to the limited current available, thus, causing unwanted delays in the functionality of the ignition system. The power supply sub-circuit 58 is designed to allow higher amounts of current to quickly flow into the power supply capacitor 92, which charges the power supply more rapidly and brings it to a sufficient DC operating level in a shorter amount of time than is experienced with a simple current limiting circuit.

As mentioned above, the electrical energy that is saved or not used by power supply sub-circuit 58 may be applied to any number of different devices around the engine. One example of such a device is a solenoid that controls the air/fuel ratio of the gas mixture supplied from a carburetor to a combustion chamber. Referring back to FIG. 2, the first auxiliary winding 38 and the second auxiliary winding 39 could be coupled to a device 88, such as a solenoid, an additional microcontroller or any other device requiring electrical energy. The first and second auxiliary windings 38 and 39 may be connected in parallel with each other and may each have one terminal coupled to the solenoid via intervening diodes 100 and 102, respectively and their other terminals coupled to ground. A zener diode 104 may be connected in parallel between the solenoid and coils 38 and 39 to protect the solenoid from a voltage greater than the zener diode breakdown voltage (excess current flows through the zener diode to ground).

In at least some implementations, the auxiliary coils 38 and 39 have different properties or constructions to provide power more effectively under different operating conditions. For example, the first auxiliary winding 38 may have a greater number of turns than the second auxiliary winding 39. In this case, the first auxiliary winding 38 may provide more power to the solenoid at lower engine operating speeds and the second auxiliary winding 39 may provide more power to the solenoid at higher engine operating speeds when there is too much inductance for the first auxiliary coil 38 to effectively charge the auxiliary load (solenoid 88 in this example).

Both coils may provide power to the solenoid in operation, and this may assist power supply to the solenoid across a wide range of engine operating speeds including mid-range speeds wherein neither coil 38 or 39 is at its peak efficiency in providing power to the solenoid (e.g. where one is designed for low speed power supply and the other is designed for high speed power supply). In this way, effective power supply to the solenoid and rapid recharging rates can be realized during low speed, mid-range speed and high speed engine operation. In at least some implementations, a ratio of the number of turns in the first auxiliary coil 38 to the number of turns in the second auxiliary coil 39 is at least 1.5:1, and may be up to 10:1. In at least some implementations, the wire used for each coil 38, 39 may be between 25 gauge and 45 gauge, and the coils may have between 50 and 2,000 turns (and also satisfy the above noted ratio of turns).

In one non-limiting example, provided solely for ease of explanation, a first coil with a greater number of coils than a second coil may charge an auxiliary load from zero volts to ten volts within about three engine revolutions at a relatively low engine speed of 1,200 rpm and within about five revolutions at a relatively high engine speed of 12,000 rpm. The time for five revolutions may be unsatisfactory in at least some applications, and may limit the performance of the solenoid under at least certain engine operating conditions. The second coil, with fewer turns than the first coil, might take far more engine revolutions than desired (up to an infinite number) to charge the auxiliary load from zero volts to ten volts at a relatively low engine speed of 1,200 rpm and may do so within about two revolutions at a relatively high engine speed of 12,000 rpm. Hence, the combination of coils 38 and 39 may provide a desired recharge of the auxiliary load (e.g. 10 volts in this example) in three revolutions or less at low and high engine speeds. Likewise, the combination of coils 38 and 39 provides an improved power response to the solenoid 88 over the range of speeds between low and high speeds.

During a first segment of the negative AC voltage waveform, the charge winding 32 powers sub-circuit 58 at the same time that the windings 38 and 39 power device 88; during a second segment, however, only the windings 38 and 39 might have to power device 88, as the power supply capacitor 92 has been turned off so that the sub-circuit 58 only draws minimal power. There is less magnetic load on the charge winding 32 during the second segment and therefore there is more electrical energy available to power device 88. The transition point between the first and second segments of the negative AC voltage may occur when the charge on the power supply capacitor 92 exceeds the breakdown voltage of power supply zener 94. At this point, capacitor 92 is no longer being charged.

In some applications, at low engine speeds (e.g., between about 1,000-1,500 rpm), the solenoid or other device 88 might not be activated, or might be activated less frequently, and, thus does not require much energy. At higher engine speeds, the power supply sub-circuit 58 may have enough stored energy that first power supply switch 90 only turns 'on' for short periods of time every couple of engine revolutions. In this case, the excess energy, which previously was wasted, can be coupled into windings 38 and 39 to power solenoid 88 or some other device. One potential consequence of this arrangement is that more electrical power may be routed to external devices like solenoid 88, thereby allowing them to be controlled and effectively recharged or powered at even lower engine speeds.

Figure 2:
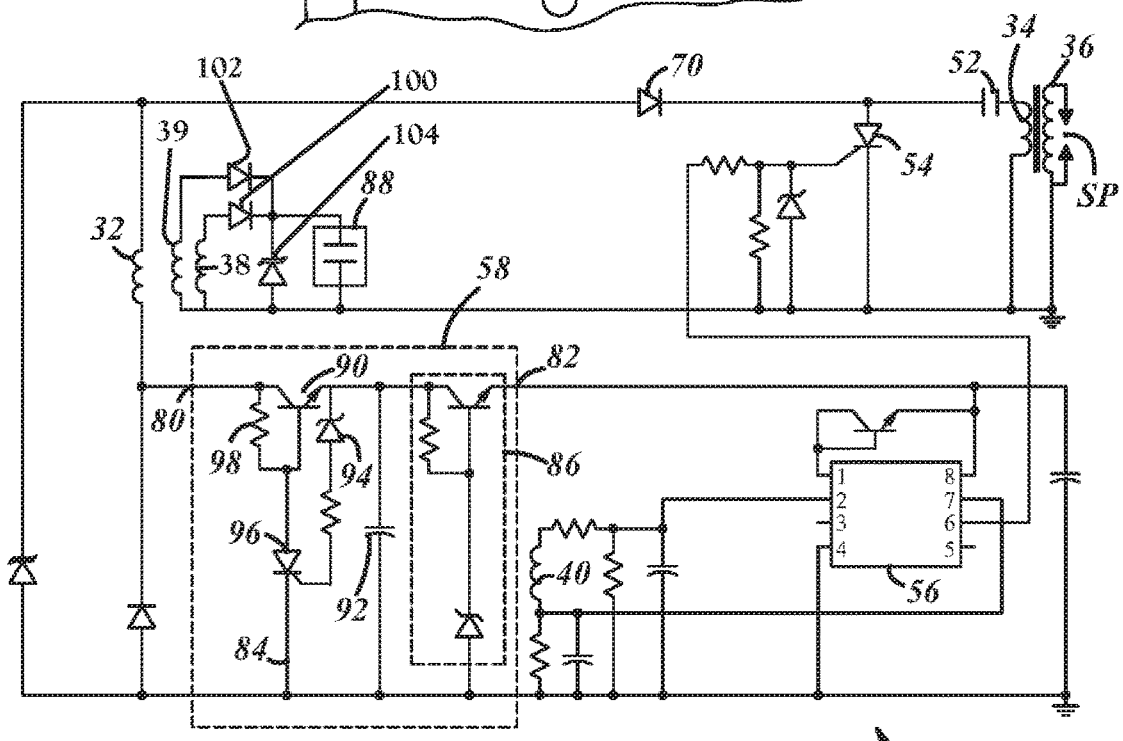
FIG. 2 is a schematic diagram of a circuit that may be used with the CDI system of FIG. 1.

It should be appreciated that the ignition system 10 described in the preceding paragraphs and illustrated in the circuit schematic of FIG. 2, including power supply sub-circuit 58, is only one example of how such a system could be implemented. It is certainly possible to implement this ignition system and/or power supply sub-circuit using a different combination or arrangement of electrical components or elements. The ignition system and/or power supply sub-circuit are not limited to the exact embodiments disclosed herein, as they are simply provided as illustrative examples.

It will of course be understood that the foregoing description is of preferred exemplary embodiments of the invention and that the invention is not limited to the specific embodiments shown. Various changes and modifications will become apparent to those skilled in the art and all such variations and modifications are intended to come within the spirit and scope of the appended claims.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. An ignition system for a light-duty combustion engine, comprising:
    a primary winding and a secondary winding arranged as a transformer with the secondary winding adapted to provide power to a spark plug;
    an ignition discharge capacitor coupled to the primary winding;
    a charge winding coupled to the ignition discharge capacitor;
    a first auxiliary winding adapted to provide power for an auxiliary load;
    a second auxiliary winding coupled in parallel with the first auxiliary winding such that both windings are arranged to provide power to an auxiliary load, wherein the auxiliary load is a component not within the ignition system;
    a microcontroller;
    a power supply sub-circuit coupled to both the charge winding and the microcontroller, wherein the power supply sub-circuit includes a first power supply switch, a power supply capacitor and a power supply zener, and the power supply sub-circuit is arranged to turn off the first power supply switch so that it stops charging the power supply capacitor when the charge on the power supply capacitor exceeds the breakdown voltage on the power supply zener.

2. The power supply of claim 1 wherein the first auxiliary winding includes a greater number of turns than the second auxiliary winding.

3. The power supply of claim 1 wherein a ratio of the number of turns in the first auxiliary winding to the number of turns in the second auxiliary winding is between 1.5:1 and 10:1.

4. The power supply of claim 2 wherein a ratio of the number of turns in the first auxiliary winding to the number of turns in the second auxiliary winding is between 1.5:1 and 10:1.

5. The power supply of claim 2 wherein the first auxiliary coil and the second auxiliary coil have between 50 and 2,000 turns.

6. The power supply of claim 4 wherein the first auxiliary coil and the second auxiliary coil have between 50 and 2,000 turns.

7. The power supply of claim 2 wherein the first auxiliary coil and the second auxiliary coil are formed from wire between 25 and 45 gauge.

8. The power supply of claim 4 wherein the first auxiliary coil and the second auxiliary coil are formed from wire between 25 and 45 gauge.

9. An ignition system for a light-duty combustion engine, comprising:
 a charge winding;
 a first auxiliary winding adapted to provide power for an auxiliary load;
 a second auxiliary winding adapted to provide power for the auxiliary load;
 a microcontroller;
 a power supply sub-circuit coupled to both the charge winding and the microcontroller, wherein the power supply sub-circuit includes a first power supply switch, a power supply capacitor and a power supply zener, and the power supply sub-circuit is arranged to turn off the first power supply switch so that it stops charging the power supply capacitor when the charge on the power supply capacitor exceeds the breakdown voltage on the power supply zener.

10. The ignition system of claim 9 wherein the second auxiliary winding is coupled in parallel with the first auxiliary winding such that both windings are arranged to provide power to an auxiliary load.

11. The ignition system of claim 9 wherein the first auxiliary winding includes a greater number of turns than the second auxiliary winding.

12. The ignition system of claim 11 wherein a ratio of the number of turns in the first auxiliary winding to the number of turns in the second auxiliary winding is between 1.5:1 and 10:1.

13. The ignition system of claim 12 wherein the first auxiliary coil and the second auxiliary coil have between 50 and 2,000 turns.

14. The ignition system of claim 11 wherein the first auxiliary coil and the second auxiliary coil have between 50 and 2,000 turns.

15. The ignition system of claim 12 wherein the first auxiliary coil and the second auxiliary coil are formed from wire between 25 and 45 gauge.

16. A light-duty combustion engine system, comprising:
 a flywheel that is rotated in use and includes at least one magnet;
 a charge winding adjacent to the flywheel so that said at least one magnet induces a voltage in the charge winding as the flywheel is rotated;
 a first auxiliary winding adapted to provide power for an auxiliary load and having a first number of turns;
 a second auxiliary winding adapted to provide power for the auxiliary load and having a second number of turns wherein the second number of turns is less than the first number of turns;
 a microcontroller;
 a power supply sub-circuit coupled to both the charge winding and the microcontroller, wherein the power supply sub-circuit includes a first power supply switch, a power supply capacitor and a power supply zener, and the power supply sub-circuit is arranged to turn off the first power supply switch so that it stops charging the power supply capacitor when the charge on the power supply capacitor exceeds the breakdown voltage on the power supply zener.

17. The system of claim 16 wherein the flywheel includes at least two magnets that are spaced apart on the flywheel.

18. The system of claim 17 wherein said at least two magnets are spaced apart between 170 and 190 degrees.

19. The power supply of claim 1 wherein the auxiliary load is an electrically powered valve.

20. The power supply of claim 1 wherein the electrically powered valve is a solenoid valve in a carburetor that may be used to alter the air and fuel mixture provided from the carburetor to the engine.

\* \* \* \* \*